(12) United States Patent
Erhard et al.

(10) Patent No.: US 6,577,666 B2
(45) Date of Patent: Jun. 10, 2003

(54) LASER AMPLIFICATION SYSTEM

(75) Inventors: Steffen Erhard, Fellbach (DE); Adolf Giesen, Renningen (DE); Martin Karszewski, Renningen (DE); Christian Stewen, Leinfelden-Echterdingen (DE); Andreas Voss, Schramberg (DE)

(73) Assignee: Universitaet Stuttgart Institut fuer Strahlwerkzeuge, Stuttgart (DE)

( * ) Notice: Subject to any disclaimer, the term of this patent is extended or adjusted under 35 U.S.C. 154(b) by 250 days.

(21) Appl. No.: 09/776,176

(22) Filed: Feb. 2, 2001

(65) Prior Publication Data

US 2001/0040909 A1 Nov. 15, 2001

Related U.S. Application Data

(63) Continuation of application No. PCT/EP99/05129, filed on Jul. 19, 1999.

(30) Foreign Application Priority Data

Aug. 4, 1998 (DE) .......................................... 198 35 107

(51) Int. Cl.[7] ............................................... H01S 3/081
(52) U.S. Cl. .............................. 372/70; 372/92; 372/99; 372/69
(58) Field of Search .............................. 372/69, 70, 92, 372/99, 9

(56) References Cited

U.S. PATENT DOCUMENTS 6,285,703 B1 * 9/2001 Schlueter ..................... 372/95

FOREIGN PATENT DOCUMENTS

| DE | 40 08 225 | 9/1991 |
|---|---|---|
| DE | 195 41 020 | 5/1997 |
| DE | 197 28 845 | 1/1999 |
| EP | 0 632 551 | 1/1995 |

OTHER PUBLICATIONS

Giesen, A., et al., "Scalable Concept for Diode–Pumped High–Power Solid–State Lasers", Applied Physics B: Photo-physics and Laser Chemistry, B58 (1994) May, No. 5 pp. 365–372, Berlin, Germany.

Brauch, U., et al., "Multiwatt diode–pumped Yb: YAG thin disk laser continuously tunable between 1018 and 1053 nm", Apr. 1, 1995, vol. 20, No. 7 Optical Letters pp. 713–715, Optical Society of America.

\* cited by examiner

*Primary Examiner*—Leon Scott, Jr.
(74) *Attorney, Agent, or Firm*—Barry R. Lipsitz

(57) ABSTRACT

In order to improve a laser amplification system, comprising a solid-state body having a laser-active medium, a pumping radiation source for generating a pumping radiation field which passes through the solid-state body several times, an optical pumping radiation imaging means which is arranged between the pumping radiation source and the solid-state body and focuses a leg of the pumping radiation field entering the solid-state body onto the solid-state body and at least one optical refocusing means which focuses a leg of the pumping radiation field exiting from the solid-state body onto the solid-state body again in the form of a leg entering the solid-state body and different to the outgoing leg, in such a manner that as high a pumping radiation power density as possible can be generated in the solid-state body with as little resources as possible it is suggested that the optical refocusing means reshape the leg exiting from the solid-state body into an intermediately collimated leg and reshape the intermediately collimated leg again into the leg entering the solid-state body again and focused onto it.

32 Claims, 7 Drawing Sheets

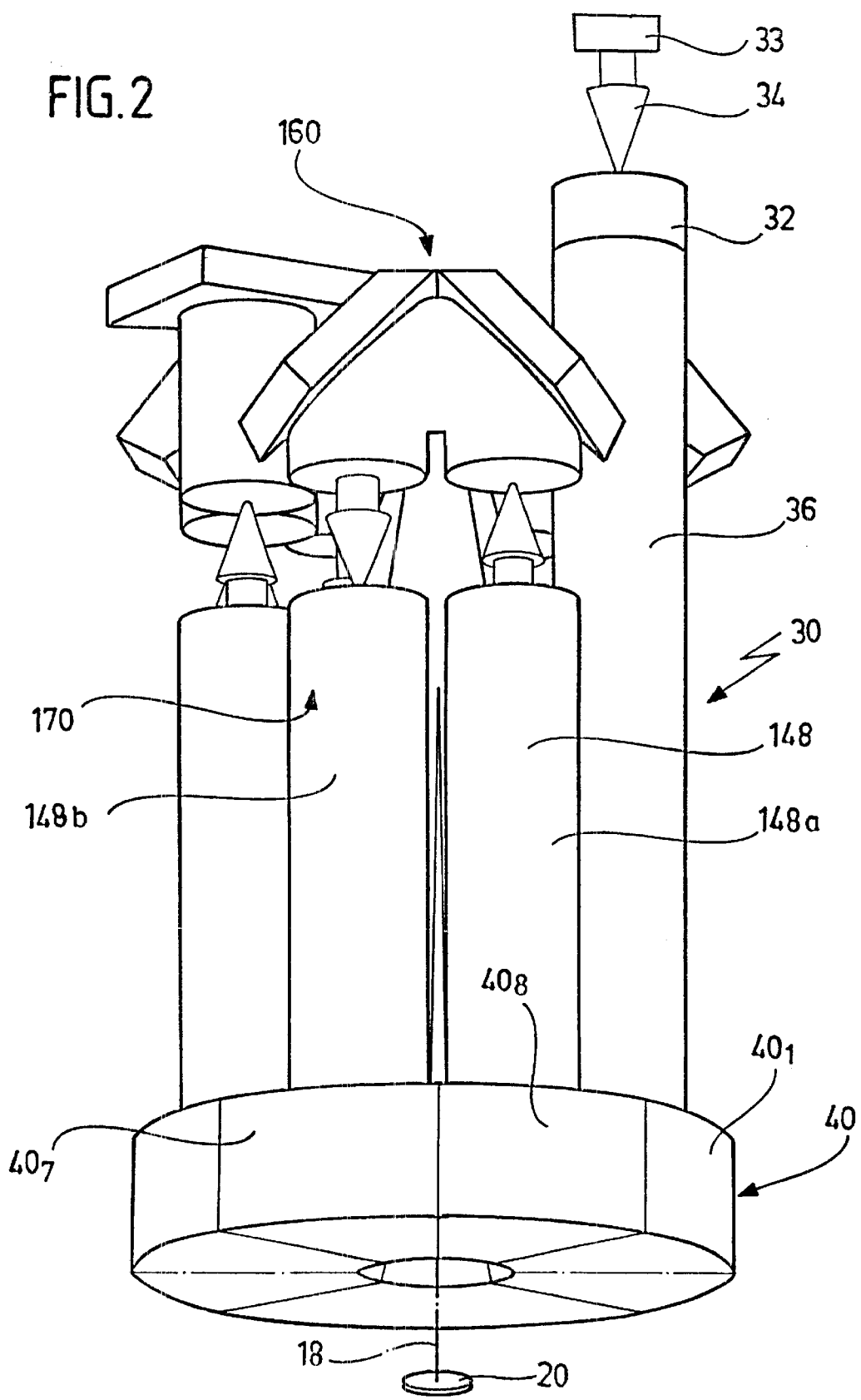

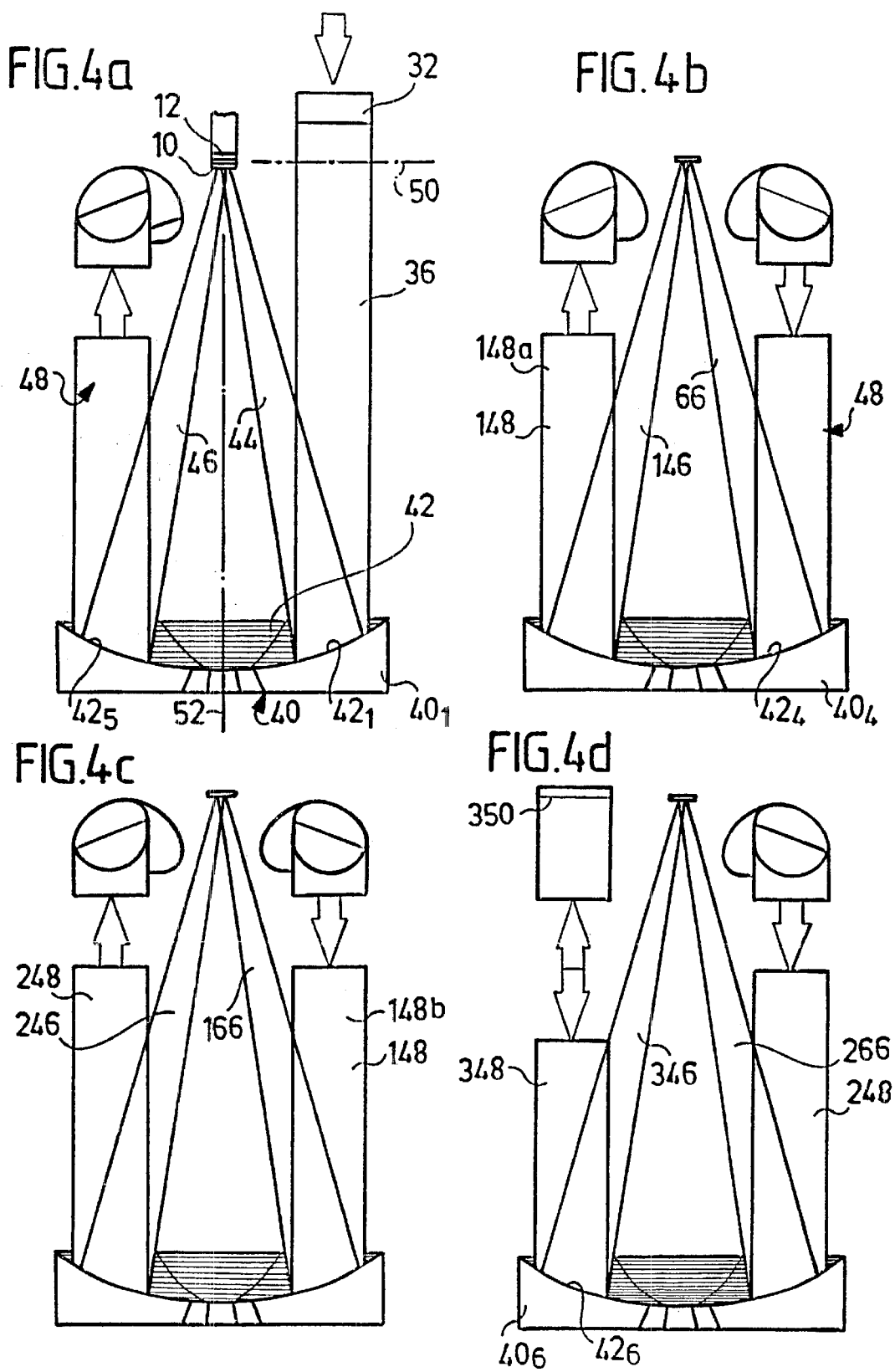

LASER AMPLIFICATION SYSTEM

This application is a continuation of international application No. PCT/EP99/05129 filed on Jul. 19, 1999.

The present disclosure relates to the subject matter disclosed in International Application No. PCT/EP99/05129 (WO 00/08728) of Jul. 19, 1999, the entire specification of which is incorporated herein by reference.

The invention relates to a laser amplification system, comprising a solid-state body having a laser-active medium, a pumping radiation source for generating a pumping radiation field which passes through the solid-state body several times, an optical pumping radiation imaging means which is arranged between the pumping radiation source and the solid-state body and focuses a leg of the pumping radiation field entering the solid-state body onto the solid-state body, and at least one optical refocusing means which focuses a leg of the pumping radiation field exiting from the solid-state body onto the solid-state body again in the form of a leg entering the solid-state body and different to the outgoing leg.

A laser amplification system of this type is known, for example, from EP 0 632 551. With this laser amplification system the leg exiting from the solid-state body is merely deflected and refocused onto the solid-state body.

The disadvantage of such an optical refocusing means consists in the fact that with it the cross section of the pumping radiation field to be focused is always increased in size or considerable losses occur as a result of the fact that part of the pumping radiation field is not refocused onto the solid-state body again. Altogether, it is a problem to achieve as high a pumping radiation power density as possible in the solid-state body, in particular, under the premise that as many passes of the pumping radiation field as possible are aimed for since the absorption of the laser-active medium in the solid-state body is low with a single pass of the pumping power.

The object underlying the invention is therefore to improve a laser amplification system of the generic type in such a manner that as high a pumping radiation power density as possible can be generated in the solid-state body with as little resources as possible.

This object is accomplished in accordance with the invention, in a laser amplification system of the type described at the outset, in that the optical refocusing means reshapes the leg exiting from the solid-state body into an intermediately collimated leg and reshapes the intermediately collimated leg into a leg entering the solid-state body again and focused onto it.

The advantage of the inventive solution is to be seen in the fact that it is possible, as a result of an intermediately collimated leg being generated, to keep the diameter of the pumping light spot approximately the same size, despite refocusing, without the optical element required for the focused leg of the optical refocusing means needing to be adapted to a large beam cross section. In addition, the imaging quality during the refocusing can also be kept essentially constant.

It is particularly favorable when the pumping radiation field passes through several optical refocusing means in series one after the other since their advantages with respect to the imaging quality then become particularly evident, especially with a view to an essentially constant, maximum cross section of the pumping radiation field with an essentially equal pumping radiation spot diameter.

Purely in principle it would be conceivable with the provision of several optical focusing means not only to pump one solid-state body but rather to pump several solid-state bodies therewith.

The inventive advantages become particularly clearly evident when the incoming legs of the several optical refocusing means enter the same solid-state body so that it is, in particular, possible to pump the laser-active medium in one and the same solid-state body in the case of an essentially constant pumping radiation spot diameter with one and the same pumping radiation field under optimum utilization of the power of the pumping radiation source.

This may be realized particularly favorably when the legs entering the same solid-state body enter the same volume area of the solid-state body so that, using the fact that a constant pumping radiation spot diameter may be generated, a volume area corresponding in cross section to this pumping radiation spot diameter can also be pumped several times by the several optical refocusing means and thus a particularly high exploitation of the pumping radiation power is ensured.

One embodiment of the inventive laser amplification system which can be realized particularly favorably, especially from a geometrical point of view, provides for each optical refocusing means to reshape the leg of the pumping radiation field exiting from the solid-state body to form a first partial leg of the intermediately collimated leg, to reshape this first partial leg into a second partial leg of the intermediately collimated leg extending next to it and to form the leg entering the solid-state body from the second partial leg.

The optical refocusing means may be constructed particularly favorably with respect to the space required due to such a folding of the intermediately collimated leg into two partial legs.

Such a folding of the intermediately collimated leg may be achieved particularly favorably when each optical refocusing means has a deflection element for imaging the first partial leg of the intermediately collimated leg into the second partial leg thereof.

With respect to the additional design of the optical refocusing means no further details have been given. One advantageous embodiment, for example, provides for each optical refocusing means to have a collimating element for imaging the outgoing arm into the intermediately collimated leg. This means that the imaging of the outgoing leg into the intermediately collimated leg can be realized in a simple manner.

Furthermore, an additional embodiment provides for each optical refocusing means to have a focusing element for imaging the intermediately collimated leg into the leg entering the solid-state body.

Purely in principle it would be possible with the inventive solution to carry out the pumping of the solid-state body such that the pumping radiation source passes through the solid-state body each time free from reflection when passing from one optical refocusing means to the other optical refocusing means.

A particularly favorable configuration can, however, be achieved when a reflector is associated with a flat side of the solid-state body and the outgoing leg results due to reflection of the incoming leg at the reflector since, in this case, a twofold pumping of the solid-state body is already brought about due to the reflection.

With respect to the alignment of the individual legs in relation to the reflector no further details have so far been given. Particularly favorable conditions may be achieved when a partial leg of the intermediately collimated leg of each optical refocusing means extends parallel to a normal line to a reflection surface of the reflector.

Even more favorable imaging conditions may be created when both partial legs of the intermediately collimated leg of the optical refocusing means extend parallel to the normal line.

A leg of the pumping radiation field entering the solid-state body and the outgoing leg thereof resulting due to reflection of the leg at the reflector define a plane extending through the normal line to the reflection surface of the reflector.

The optical refocusing means are preferably designed with such a solution such that the leg of each optical refocusing means exiting from the solid-state body and the leg thereof entering the solid-state body are located in different planes extending through the normal line.

With respect to the arrangement of the collimating elements of the optical refocusing means no particular details have so far been given. One advantageous embodiment, for example, provides for the collimating elements of all the optical refocusing means to be arranged around the normal line.

In this respect, it is preferably provided for the collimating elements of all the optical refocusing means to be arranged at the same radial distance around the normal line.

Furthermore, it is particularly advantageous for the collimating elements of consecutive optical refocusing means to be arranged at the same angular distances around the normal line.

A solution which is particularly favorable with respect to the optical quality of the refocusing provides for the collimating elements of all the optical refocusing means to be of an identical design.

In the same way it is preferably provided with respect to the focusing elements for the focusing elements of all the optical refocusing means to be arranged around the normal line.

In this respect, it is particularly favorable when the focusing elements of all the optical refocusing means are arranged at the same radial distances around the normal line.

With respect to the angular distances it is likewise advantageous when the focusing elements of consecutive optical refocusing means are arranged at the same angular distances around the normal line.

It is particularly favorable when the focusing elements of all the optical refocusing means are of an identical design.

With respect to the design of the collimating elements in particular, no further details have so far been given. It would be conceivable, for example, to use lenses as collimating elements. A particularly favorable construction may be achieved when the collimating elements are formed by hollow mirrors.

It is particularly expedient when mirrors which are parabolic in cross section or circular in cross section are used as hollow mirrors.

These mirrors could, in principle, be designed such that they generate a line focus.

It is, however, particularly favorable when the hollow mirrors are designed such that they essentially generate a point focus.

A particularly advantageous form of the collimating elements provides for these to be formed by segments of a rotationally symmetrical mirror, wherein the mirror is preferably designed to be rotationally symmetrical to the normal line to the reflection surface.

No further details have likewise been given with respect to the focusing elements. In principle, it would also be conceivable to design the focusing elements as lenses. In this respect, as well, hollow mirrors, in particular, have proven to be advantageous.

The hollow mirrors are expediently designed as mirrors parabolic or circular in cross section.

It would also be conceivable with respect to the hollow mirrors to use those which generate a line focus. It is, however, particularly favorable when the focusing elements are formed by segments of a rotationally symmetrical mirror, wherein the rotationally symmetrical mirror is preferably designed so as to be likewise rotationally symmetrical to the normal line to the reflection surface.

No further details have so far been given with respect to the focal distance of the collimating elements and the focusing elements. It would, in principle, be conceivable to use different focal distances. It has, however, proven to be particularly expedient when all the collimating elements of the optical refocusing means have the same focal distance.

Furthermore, it has proven to be advantageous when all the focusing elements of the optical refocusing means have the same focal distance.

A particularly favorable solution provides for not only the collimating but also the focusing elements of all the optical refocusing means to have the same focal distance.

A solution which is expedient with respect to the production and adjustment of the collimating and focusing elements provides for the collimating elements and the focusing elements of all the optical refocusing means to be formed by segments of a single rotationally symmetrical hollow mirror. In this case, it would, however, also be conceivable to arrange the individual segments so as to be inclined or tilted relative to one another.

A solution is therefore more simple, with which the collimating elements and the focusing elements of all the optical refocusing means are formed by segments of a single rotationally symmetrical hollow mirror with a continuous mirror surface so that not only the collimating elements but also the focusing elements have the same alignment relative to the axis of rotation of the rotationally symmetrical hollow mirror, in particular, to the normal line to the reflection surface of the reflector.

With respect to the arrangement of the deflection elements of all the optical refocusing means no further details have as yet been given. One advantageous embodiment, for example, provides for the deflection elements of all the optical refocusing means to be arranged around the normal line.

In this respect, it is preferably provided for the deflection elements of all the optical refocusing means to be arranged at the same radial distances around the normal line.

A particularly favorable solution from a geometrical point of view provides for the deflection elements of consecutive optical refocusing means to be arranged at the same angular distances around the normal line.

A particularly favorable solution from a constructional point of view provides for the deflection elements of all the optical refocusing means to be of an identical design.

With respect to the relative arrangement of the collimating element and the focusing element of each of the optical refocusing means no further details have so far been given. It would, for example, be conceivable to select the distances between the collimating elements and the focusing elements as required. However, particularly favorable imaging conditions may be achieved when the distance between the collimating element and the focusing element of each optical refocusing means corresponds essentially to the sum of their focal distances. It is particularly advantageous, in particular, in the case of equal focal distances when the distance between the collimating element and the focusing element is approximately double the focal distance thereof.

Additional features and advantages of the inventive solution are the subject matter of the following description as well as the drawings illustrating several embodiments. In the drawings:

FIG. 2 shows a perspective view of the first embodiment of the inventive laser amplification system when seen from the back and below;

FIG. 4 shows an illustration of the incoming and outgoing legs according to FIG. 3 respectively located in one plane, wherein FIGS. 4a to 4d correspond to the illustrations according to FIGS. 3a to 3d;

Figure 1:
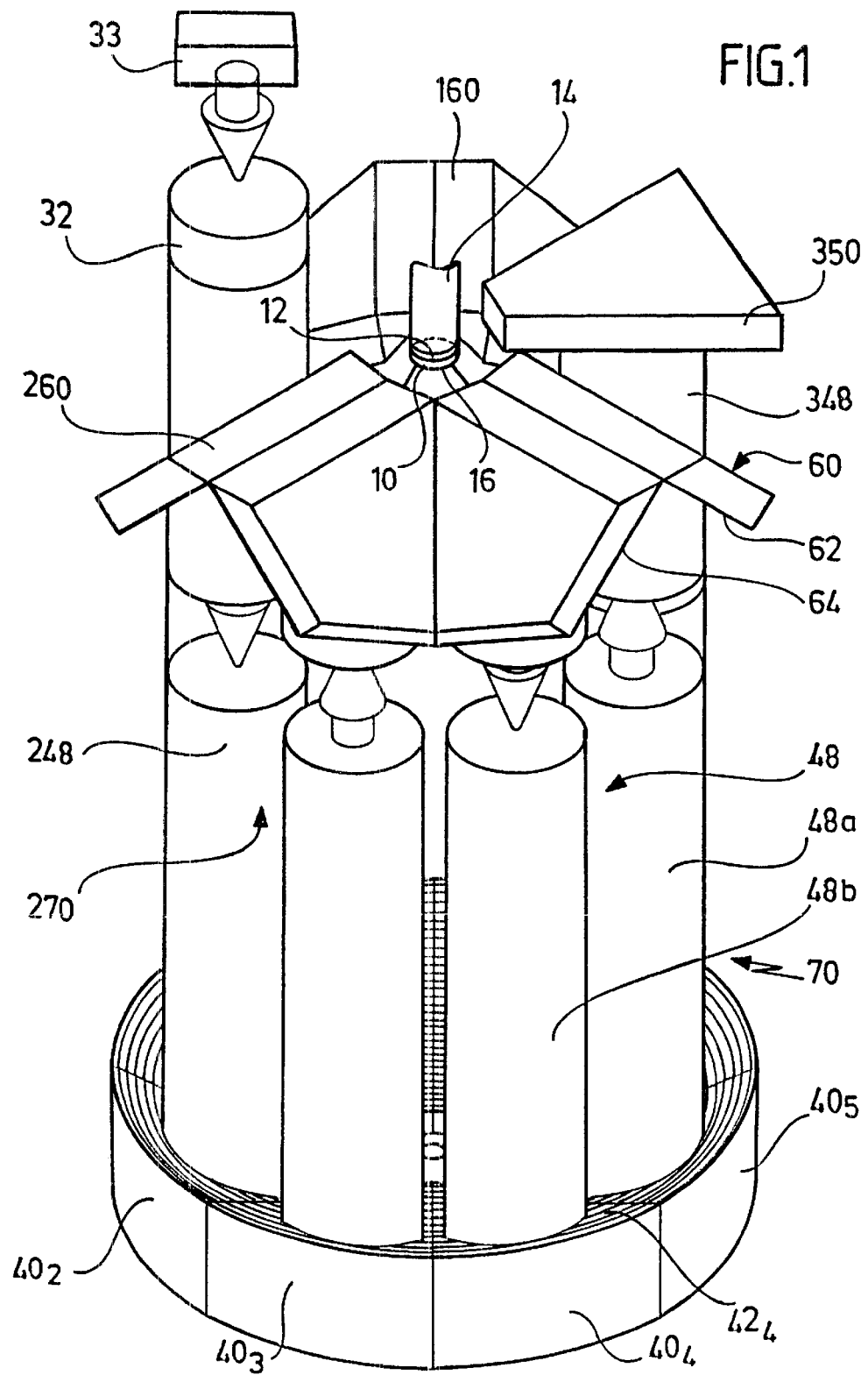
FIG. 1 shows a perspective view of a first embodiment of an inventive laser amplification system when seen from the front and above.

One embodiment of an inventive laser amplification system, illustrated in FIGS. 1 to 4, comprises a disk-shaped solid-state body 10 which has a laser-active medium and a rear and a front flat side which can be either flat or curved. The solid-state body 10 rests with the rear flat side on a reflector 12, wherein the reflector 12 is, for its part, seated on an end face of a cooling finger 14 so that the cooling finger 14 cools the solid-state body 10 via the reflector 12 located between them. In this solid-state body 10, a pumping radiation field is coupled in via the front flat side 16, as described in detail in the following, is partially absorbed by the laser-active medium, reflected at the reflector 12, partially absorbed by the laser-active medium and then coupled out. Moreover, a laser radiation field 18 exits from this flat side and this impinges on a mirror 20 which faces the solid-state body 10 and together with the reflector 12 forms a resonator for the laser radiation field 18.

A laser system of this type operates as described, for example, in EP 0 632 551, to which reference is made in full with respect to the mode of operation of the laser and the arrangement of the solid-state body on the reflector 12 and the cooling finger 14.

Figure 3A:
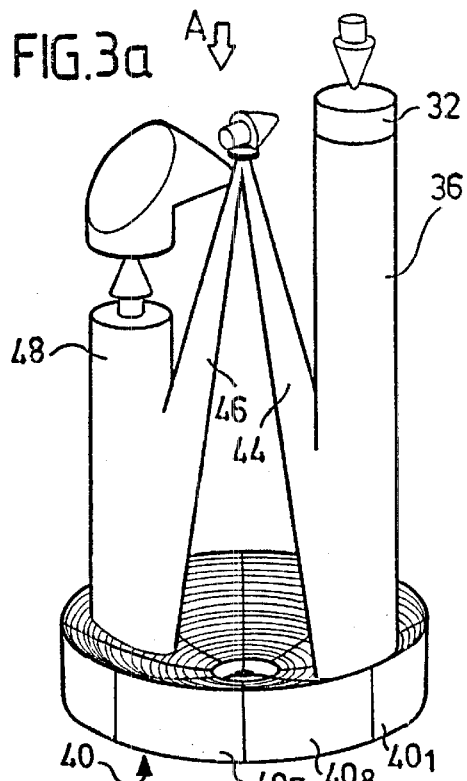
FIG. 3 shows a perspective illustration of the respective legs of the inventive laser amplification system entering the solid-state body and exiting due to reflection, wherein in each of the FIGS. 3a to 3d an incoming leg and a corresponding outgoing leg are illustrated.
Figure 3B:
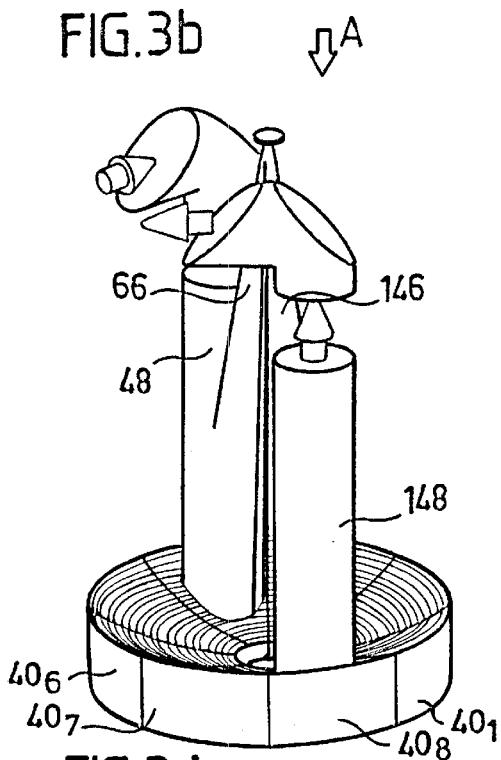
Figure 3C:
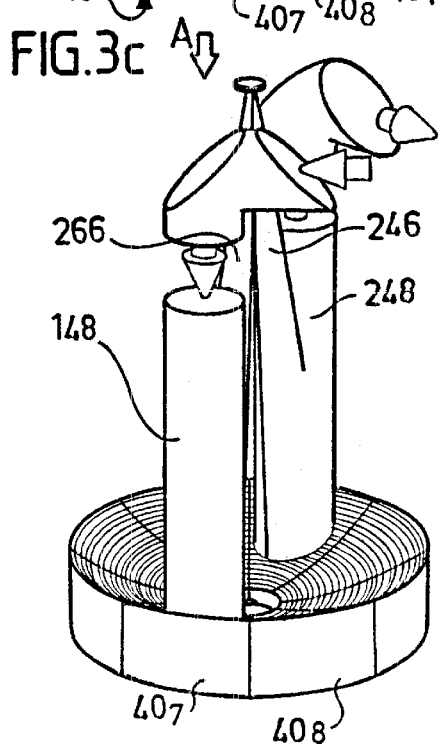
Figure 3D:
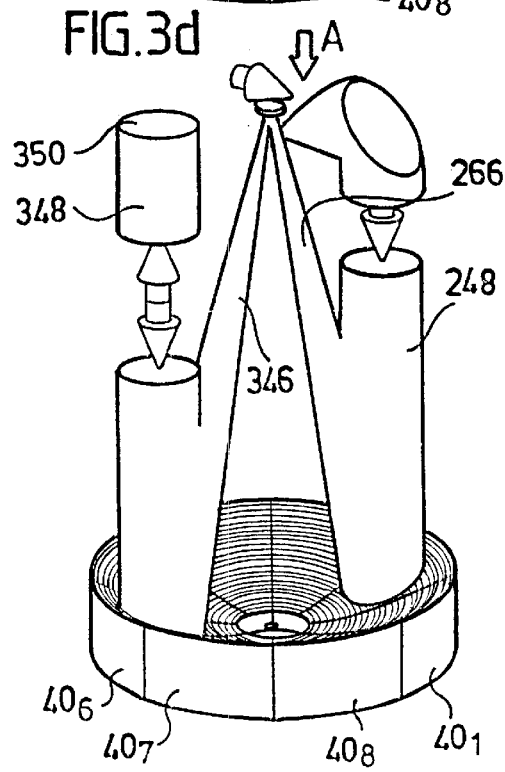

A pumping radiation coupling-in system designated as a whole as 30 is provided for pumping the laser-active medium in the solid-state body 10 and this has an optical pumping radiation imaging means 32 which collimates a pumping radiation field 34 coming from a pumping radiation source 33, for example, a diode laser—or also several diode lasers—and a light guide coupled to this and allows this to fall as a collimated leg 36 onto a segment $40_1$ of a parabolic mirror which is designated as a whole as 40 and, as illustrated in FIG. 3a and FIG. 4a, generates with its reflecting parabolic surface segment $42_1$ a focused leg 44 of the pumping radiation field which forms a leg entering the solid-state body 10.

This incoming leg 44 of the pumping radiation field enters the solid-state body 10 via the front flat side 16 thereof, passes through it and is reflected by the reflector 12, namely such that a diverging outgoing leg 46 is formed which impinges on a reflecting parabolic surface segment $42_5$ of the segment $40_5$ of the parabolic mirror 40 and is reflected by this as a first partial leg 48a of a collimated leg designated as a whole as 48.

In order to obtain the collimated partial leg 48a again proceeding from the collimated leg 36 via the incoming leg 44, the outgoing leg 46, the parabolic mirror 40 is arranged such that the solid-state body 10 is located in a focal plane 50 of the parabolic mirror 40, preferably with its flat side resting on the reflector 12, and that, in addition, a perpendicular or normal line 52 to the reflecting surface of the reflector 12 represents the axis of symmetry in relation to the parabolic surface 42 and thus extends through a focus thereof, as well.

Furthermore, it is preferably provided for the collimated leg 36 to extend parallel to the normal line 52 and fall onto the surface segment $42_1$ with this alignment and, in addition, for the partial leg 48a to likewise extend parallel to the normal line 52.

In this respect, the normal line 52 likewise preferably forms a mid-vertical in relation to the solid-state body 10 so that pumping in a volume area of the solid-state body 10 arranged symmetrically to the normal line 52 is brought about by the incoming leg 44 and the outgoing leg 46.

Furthermore, with this geometrical arrangement the incoming leg 44 and the outgoing leg 46 are respectively located parallel and mirror symmetrical to a plane 54 which extends through the normal line 52.

The partial leg 48a of the collimated leg 48 propagates, proceeding from the surface segment $42_5$, in a direction parallel to the normal line 52 to such an extent until it impinges on a deflection element 60 which is illustrated in FIG. 1 and is designed, for example, such that it has two mirror surfaces 62 and 64 which extend at right angles to one another and are aligned such that the partial leg 48a of the collimated leg 48 is imaged into a partial leg 48b which extends parallel to the partial leg 48a but alongside it, as illustrated in FIG. 1, and again propagates in the direction of the parabolic mirror 40 and thereby impinges on a surface segment $40_4$ of the parabolic mirror 40, the reflecting parabolic surface segment $42_4$ of which, as illustrated in FIG. 4b, generates; a leg 66 again entering the solid-state body 19.

Figure 5A:
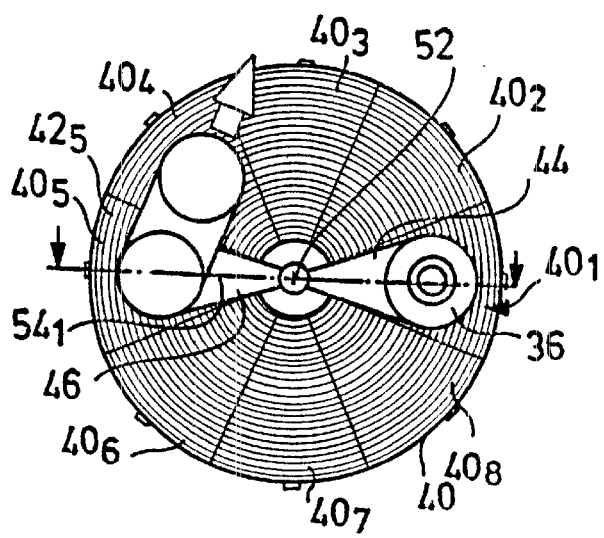
FIG. 5 shows a plan view in the direction of arrow A in FIG. 3 with FIGS. 5a to 5d corresponding to FIGS. 3a to 3d.
Figure 5B:
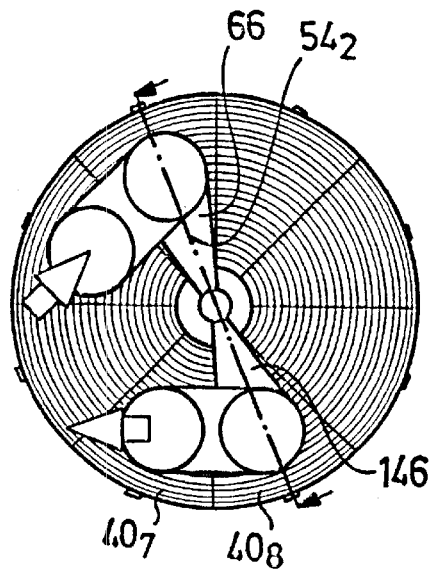

Altogether, the segments $40_5$ and $40_4$ of the parabolic mirror 40 as well as the optical deflection means 60 thus form an optical refocusing means which is designated as a whole as 70 and images the outgoing leg 46 into the collimated leg 48 and images this again into the leg 66 entering the solid-state body 10, wherein the incoming leg 66, as is apparent from FIG. 5b, is located in a plane $54_2$ which does extend through the normal line 52 but is turned in relation to the plane $54_1$, in this case through an angle of 45°.

Figure 5C:
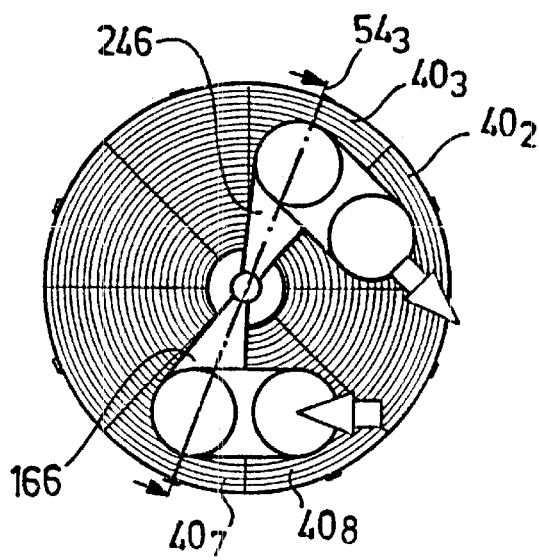

The leg 66 entering the solid-state body 10 is now reflected by the reflector 12 associated with the solid-state body 10 and as outgoing leg 146 reaches the segment $40_8$ of the parabolic mirror 40 which, with an optical deflection means 160, forms a collimated beam 148 with the partial legs 148a and 148b, this beam extending to the segment $40_7$ located next to it and being imaged by the segment $40_7$ into an incoming leg 166 which again enters the solid-state body 10 but, in this case, extends symmetrically to a plane $54_3$ which extends through the normal line 52 and is again, turned in relation to the plane $54_2$ through 45° so that the segments $40_8$ and $40_7$ as well as the optical deflection means 160 form altogether an additional optical refocusing means 170 (FIGS. 4c and 5c).

Figure 5D:
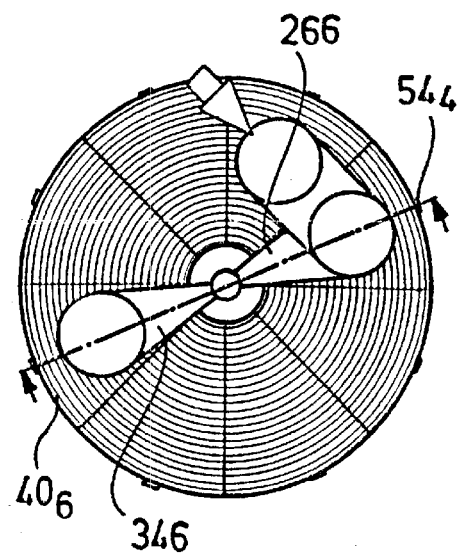

The leg 246 again exiting from the solid-state body 10 due to reflection at the reflector 12 is again focused onto the solid-state body 10 by way of an additional optical refocusing means 270, formed from the segments $40_2$ and $40_3$ as well as an optical deflection means 260, thereby forming a collimated leg 248 and forming an additional incoming leg 266, wherein the incoming leg 266 is located in a plane $54_4$ which is turned again through 45° in relation to the plane $54_3$. The outgoing leg 346 again reflected by the reflector 12 impinges, as illustrated in FIG. 4d and FIG. 5d, on the segment $40_6$ of the parabolic mirror 40, the parabolic reflecting surface segment $42_6$ of which images the outgoing divergent leg 346 into a collimated leg 348 which impinges on a reflector 350 which reflects this back into itself so that the pumping radiation field passes through the optical refocusing means 270, 170 and 70 again in a reverse direction and again passes through the solid-state body 10 several times and is reflected each time at the reflector 12 so that, in the end, the returning pumping radiation field again propagates in the direction of the optical pumping radiation imaging means 32 and thus also the pumping radiation source 33 in the form of a collimated leg 36', wherein, in this case however, this pumping radiation field is considerably weakened with respect to its intensity in relation to the incoming pumping radiation field 34 on account of it passing altogether sixteen times through the solid-state body 10.

Figure 6:
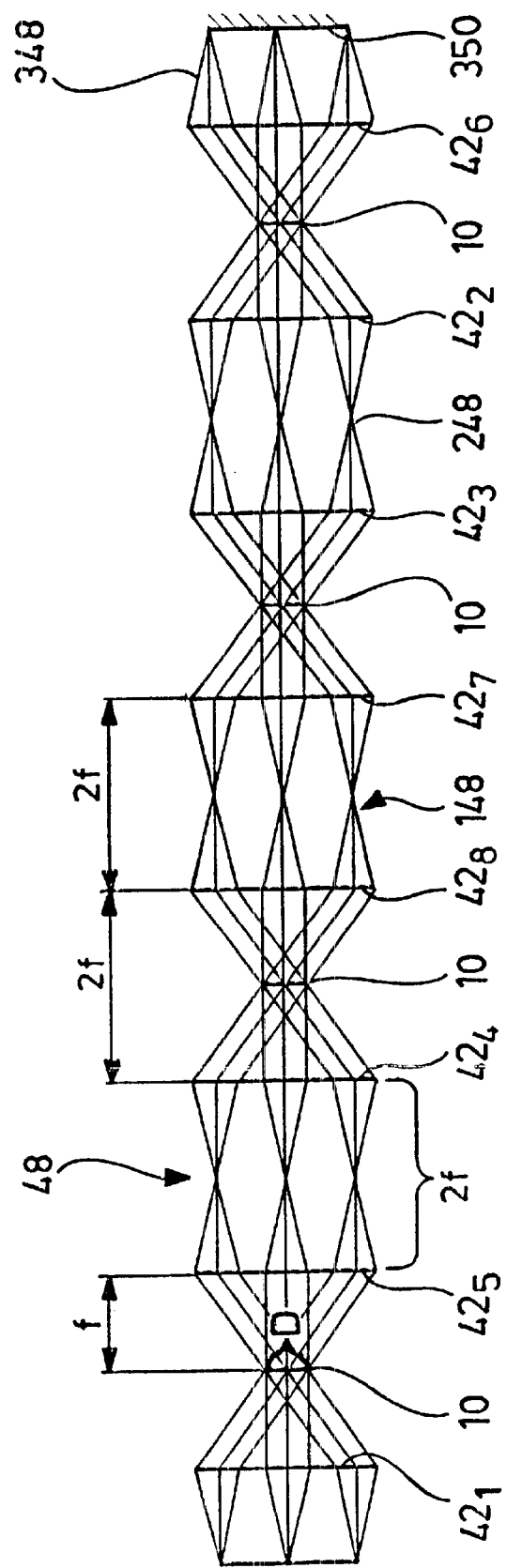
FIG. 6 shows a schematic illustration of the imaging with intermediate collimation in the first embodiment according to FIGS. 1 to 5 and FIG. 7 show a schematic, perspective and partial illustration of a second embodiment of an inventive laser amplification system.

The respective optical refocusing means 70, 170 and 270 are preferably designed such that the collimated legs 48, 148 and 248 act with respect to their behavior during the optical imaging, as illustrated in FIG. 6, as if they were arranged at the distance 2f, wherein f represents the focal distance of the parabolic mirror 40 and defines the distance between the parabolic surface 42 and the focal plane 50.

With such a design of the optical refocusing means 70, 170 and 270 it is possible, as illustrated in FIG. 6, to always focus the pumping radiation field on the solid-state body 10 with essentially the same pumping spot diameter D, wherein the pumping spot diameter is dependent on the divergence of the pumping radiation field and the focal distance of the parabolic mirror 40.

For example, apart from imaging errors, the pumping spot diameter D results in the case of an optical fiber for the supply of the pumping light radiation as follows $D = f/fk \times d,$ wherein fk is the focal distance of the optical collimation means for the collimation of the pumping radiation field and d the diameter of the fiber, from which the pumping radiation field exits.

With the inventive dimensioning of the optical refocusing means such that these have approximately the focal distance f—in particular, when using a parabolic mirror 40, the segments $40_1$ to $40_8$ of which have the same focal distance f—and the guidance of the respective collimated leg 48, 148 and 248 over a path corresponding approximately to the focal distance 2f, an increase in the size of the focal spot diameter can be avoided despite multiple refocusing and thus an optimum power density of the pumping radiation field in the solid-state body can be generated for pumping the same. The optical refocusing means preferably have a focal distance f and the collimated leg is guided over a path corresponding as exactly as possible to 2f.

In a variation of the embodiment illustrated in accordance with the invention it is possible to eliminate the segment $40_1$ of the parabolic mirror 40 and excite the laser-active medium in the solid-state body 10 directly with a focused incoming leg 44.

Furthermore, it is possible as a further variation to design the optical deflection means 60, 160 and 260 as prisms instead of with reflecting surfaces 62 and 64, wherein, in this case, the change in the imaging conditions is to be taken into consideration by way of the changing index of refraction of the prisms in order to approximately achieve imaging conditions corresponding to the path 2f with respect to the collimated leg 148.

Furthermore, a second pumping radiation source may be provided instead of the reflector 350 in the case of great absorption of the pumping radiation field in the solid-state body and thus a low power density and this source allows collimated pumping light corresponding to the collimated leg 348 to fall onto the segment $40_6$ so that this then passes through the optical refocusing means 270, 170 and 70 in the reverse direction.

In a further variation, a toric mirror, which provides an adequate imaging quality, in particular, with long focal distances, may be provided instead of a parabolic mirror 40 which, at least theoretically, provides ideal imaging conditions during the focusing onto the solid-state body 10.

In order to utilize the surface segments $42_1$ to $42_8$ in an optimum manner with respect to their shape, it is conceivable, in addition, to use a plurality of light guides instead of one collimated leg 36 generated, in the end, by one light guide. These several light guides form respective collimated partial legs which may then be combined to form an altogether collimated leg 36 which, in this case, can have any optional cross-sectional shape defined by the arrangement of the ends of the light guides in a plane and is, for example, also adapted to the shape of the respective surface segment $42_1$ to $42_8$ with respect to its cross-sectional shape.

Figure 7:
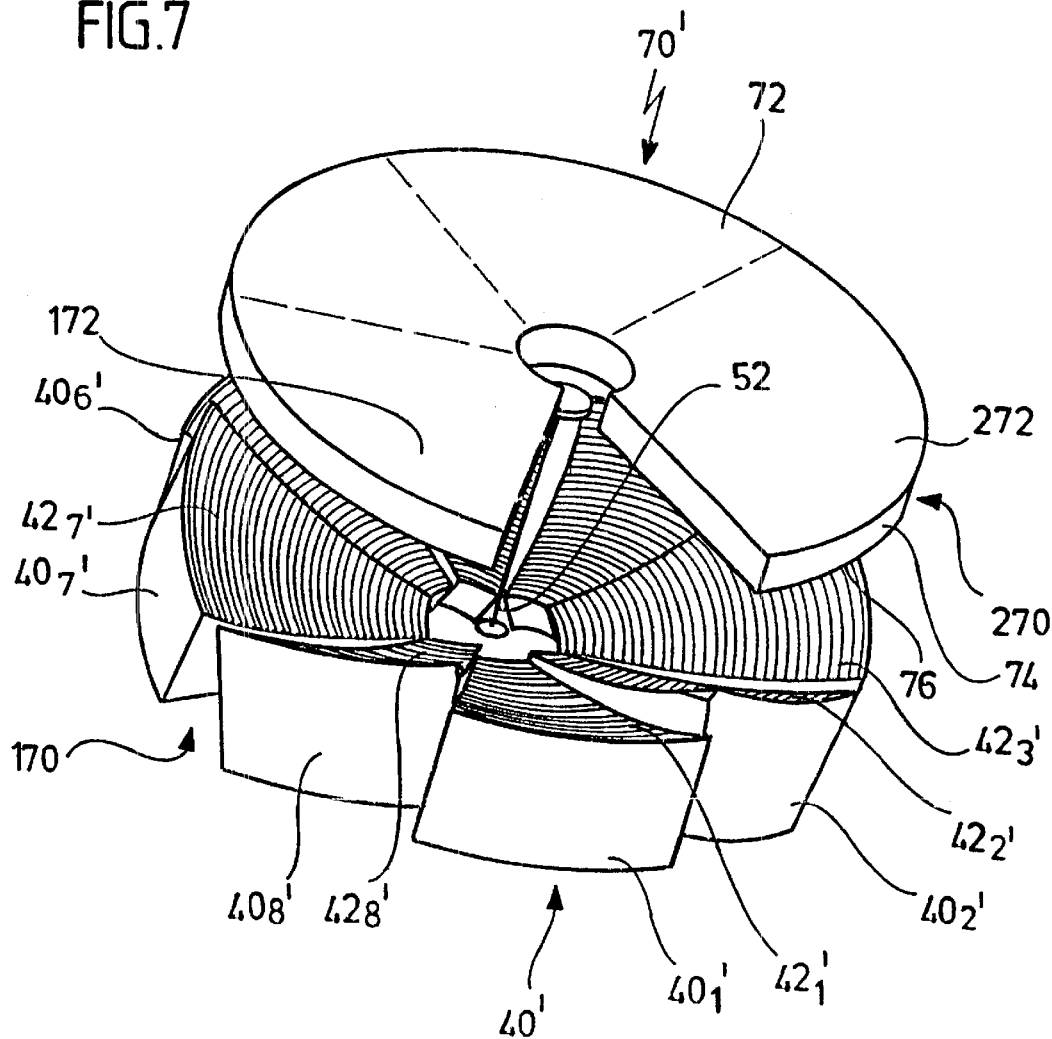

In a further embodiment of an inventive laser amplification system, illustrated in FIG. 7, the deflection elements of the individual optical refocusing means 70', 170' and 270' are formed by segments 72, 172 and 272 of a plane mirror 74 with a continuous, flat reflection surface 76 while the individual segments $40'_1$ to $40'_8$ of the parabolic mirror 40' no longer form any uniform parabolic surface but rather are tilted with their individual surface segments $42'_1$ to $42'_8$ such that the segments $42'_5$ and $42'_4$ or $40'_8$ and $40'_7$ or $42'_3$ and $42'_2$ belonging to the respective optical refocusing means 70', 170' and 270' each form a collimated partial leg which is tilted in relation to the normal line 52 and merges due to reflection into the other partial leg of the collimated leg 48 which likewise extends so as to be tilted in relation to the normal line 52 whereas the respective outgoing legs 46 and 146 and 246 and the respective incoming legs 66 and 166 and 266 each extend parallel and symmetrically to the planes $50_1$ and $50_2$ or $50_2$ and $50_3$ or $50_3$ and $50_4$, respectively.

The segments of the parabolic mirror 40' may, in the same way as in the preceding embodiment, also be segments of a toric mirror.

What is claimed is:

1. Apparatus for pumping a laser active medium in a solid state body, comprising:

a pump source for generating pumping radiation adapted to pass through the solid state body multiple times, optical imaging elements arranged between the pump source and the solid-state body, said imaging elements including a focusing element adapted to provide a first focused entry leg carrying pumping radiation towards the solid-state body, said first focused entry leg having a first cross sectional area within said solid-state body, and at least one optical refocusing element adapted to provide at least one additional focused entry leg by:

reshaping an exit leg of the pumping radiation exiting the solid-state body into an intermediately collimated leg to facilitate subsequent refocusing thereof, and reshaping the intermediately collimated leg into an additional focused entry leg carrying pumping radiation towards the solid-state body for reentry into said body, said additional focused entry leg having a cross sectional area within said solid-state body which is approximately the same as said first cross sectional area, said first and additional focused entry legs facilitating optimization of the pumping radiation power density in said solid-state body.

2. Apparatus as defined in claim 1, wherein the pumping radiation passes through several optical refocusing elements in series one after the other.

3. Apparatus as defined in claim 2, wherein the entry legs of the several optical refocusing elements always enter the same solid-state body.

4. Apparatus as defined in claim 3, wherein the legs entering the same solid-state body enter the same volume area of the solid-state body.

5. Apparatus as defined in claim 1, wherein each optical refocusing element:

reshapes the leg of the pumping radiation field exiting from the solid-state body to form a first partial leg of the intermediately collimated leg, reshapes said first partial leg into a second partial leg of the intermediately collimated leg arranged next to said first partial leg, and forms the leg entering the solid-state body from the second partial leg.

6. Apparatus as defined in claim 5, wherein each optical refocusing element has a deflection element for imaging the first partial leg of the intermediately collimated leg into the second partial leg thereof.

7. Apparatus as defined in claim 6, wherein the deflection elements of all the optical refocusing elements are arranged around the normal line.

8. Apparatus as defined in claim 7, wherein the deflection elements of all the optical refocusing elements are arranged at the same radial distances around the normal line.

9. Apparatus as defined in claim 8, wherein the deflection elements of consecutive optical refocusing elements are arranged at the same angular distances.

10. Apparatus as defined in claim 9, wherein the deflection elements of all the optical refocusing elements are of an identical design.

11. Apparatus as defined in claim 1, wherein each optical refocusing element has a collimating element for imaging the exit leg into the intermediately collimated leg.

12. Apparatus as defined in claim 11, wherein the collimating elements are formed by hollow mirrors.

13. Apparatus as defined in claim 12, wherein the collimating elements are formed by segments of a rotationally symmetrical mirror.

14. Apparatus as defined in claim 11, wherein the collimating elements of all the optical refocusing elements have the same focal distance.

15. Apparatus as defined in claim 1, wherein each optical refocusing element has a focusing element for imaging the intermediately collimated leg into the leg entering the solid-state body.

16. Apparatus as defined in claim 15, wherein the focusing elements are formed by hollow mirrors.

17. Apparatus as defined in claim 16, wherein the focusing elements are formed by segments of a rotationally symmetrical mirror.

18. Apparatus as defined in claim 15, wherein the focusing elements of all the optical refocusing elements have the same focal distance.

19. Apparatus as defined in claim 18, wherein collimating elements and the focusing elements of all the optical refocusing elements are formed by segments of a single rotationally symmetrical hollow mirror.

20. Apparatus as defined in claim 1, wherein:

a reflector is associated with a flat side of the solid-state body, and the exit leg results due to reflection of the entry leg at the reflector.

21. Apparatus as defined in claim 20, wherein a partial leg of the intermediately collimated leg of each optical refocusing element extends parallel to a normal line onto a reflection surface of the reflector.

22. Apparatus as defined in claim 21, wherein first and second partial legs of the intermediately collimated leg of the optical refocusing element extend parallel to the normal line.

23. Apparatus as defined in claim 20, wherein an entry leg of the pumping radiation field entering the solid-state body and a corresponding exit leg resulting from reflection of the entry leg at the reflector are located in a plane extending through the normal line to the reflection surface of the reflector.

24. Apparatus as defined in claim 23, wherein the exit leg of each optical refocusing element exiting from the solid-state body and the corresponding entry leg entering the solid-state body are located in different planes extending through the normal line.

25. Apparatus as defined in claim 23, wherein collimating elements of all the optical refocusing elements are arranged around the normal line.

26. Apparatus as defined in claim 25, wherein the collimating elements of all the optical refocusing elements are arranged at the same radial distance around the normal line.

27. Apparatus as defined in claim 25, wherein the collimating elements of consecutive optical refocusing elements are arranged at the same angular distances around the normal line.

28. Apparatus as defined in claim 25, wherein the collimating elements of all the optical refocusing elements are of an identical design.

29. Apparatus as defined in claim 23, wherein the focusing elements of the optical refocusing elements are arranged around the normal line.

30. Apparatus as defined in claim 29, wherein the focusing elements of all the optical refocusing elements are arranged at the same radial distances around the normal line.

31. Apparatus as defined in claim 29, wherein the focusing elements of consecutive optical refocusing elements are arranged at the same angular distances around the normal line.

32. Apparatus as defined in claim 29, wherein the focusing elements of all the optical refocusing elements are of an identical design.

* * * * *

UNITED STATES PATENT AND TRADEMARK OFFICE
CERTIFICATE OF CORRECTION

PATENT NO.    : 6,577,666 B2
DATED         : June 10, 2003
INVENTOR(S)   : Erhard et al.

It is certified that error appears in the above-identified patent and that said Letters Patent is hereby corrected as shown below:

<u>Title page,</u>
Item [75], Inventors, the city of residence for inventor Martin Karszewski is corrected to read: -- Bonndorf (DE) --; the city of residence for inventor Christian Stewen is corrected to read: -- Aichach (DE) --.

Signed and Sealed this

Twenty-first Day of October, 2003

JAMES E. ROGAN
*Director of the United States Patent and Trademark Office*